April 3, 1951   C. M. WALINE   2,547,067
AUTOMATIC COFFEE BREWER
Filed April 16, 1946   4 Sheets-Sheet 1

INVENTOR
CLIFFORD M. WALINE
BY Munn, Liddy & Glaccum
ATTORNEYS

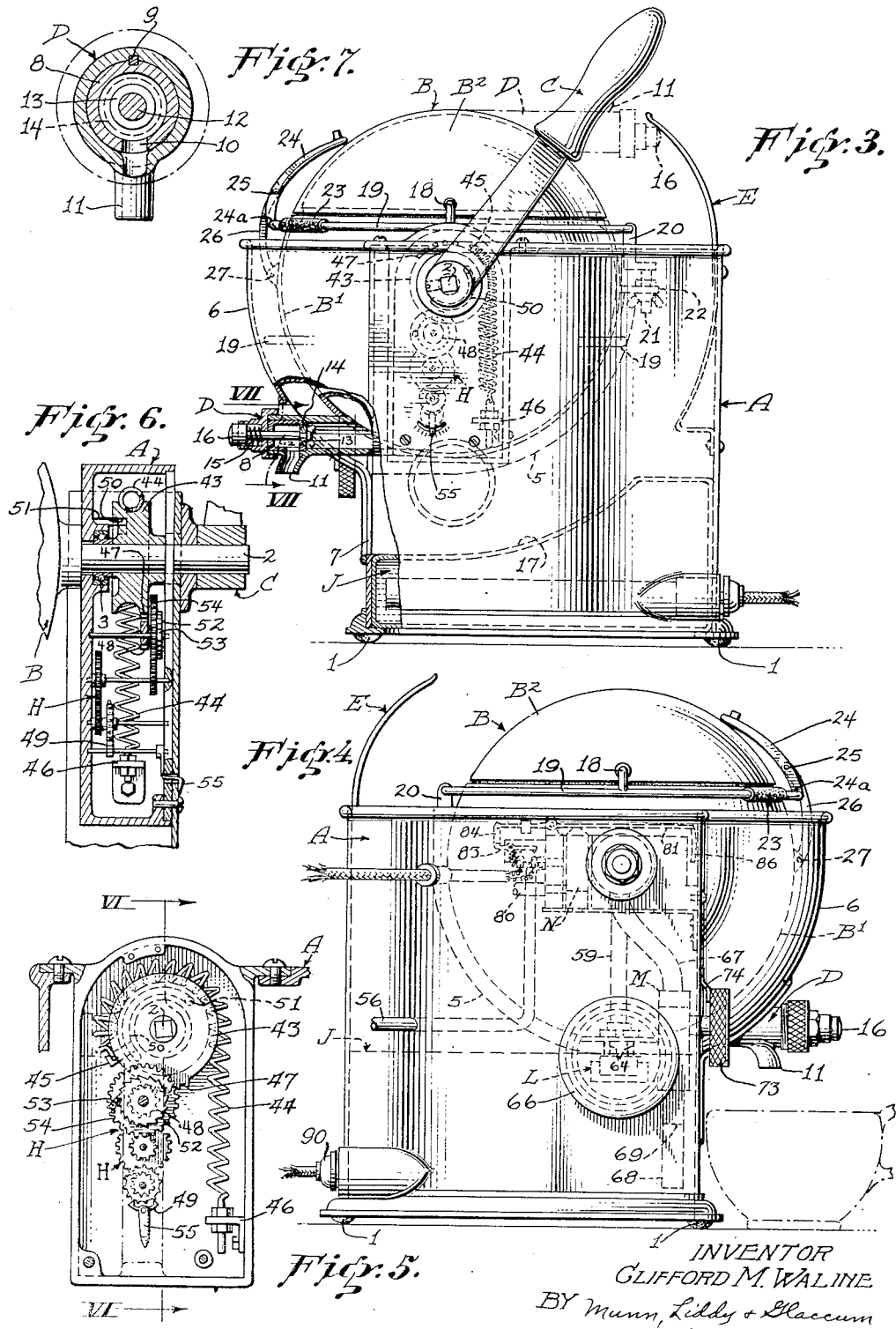

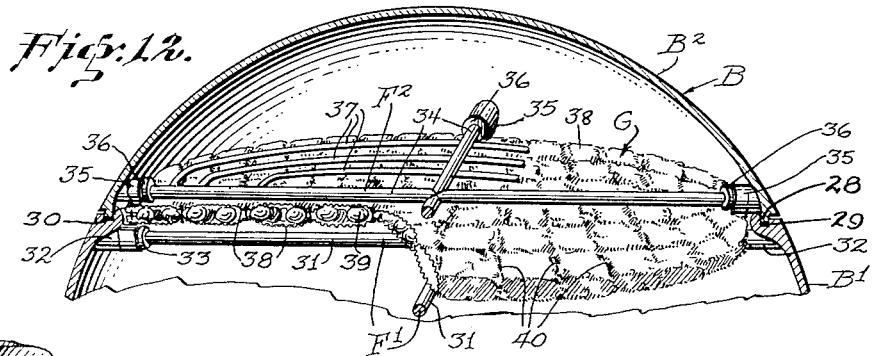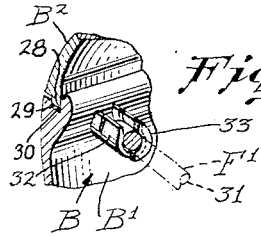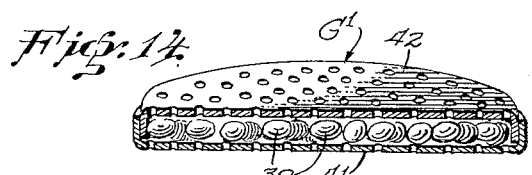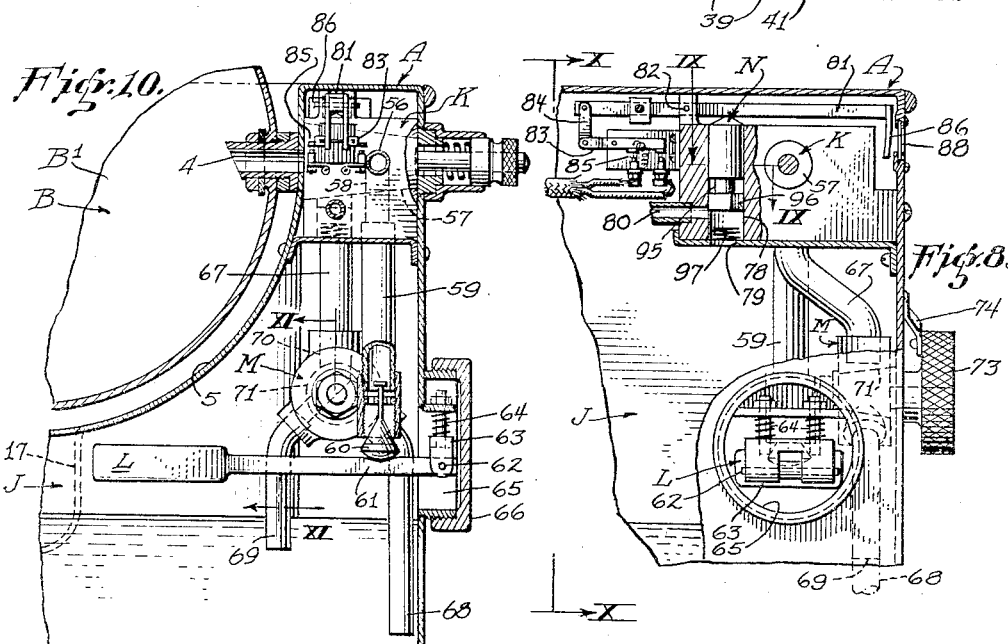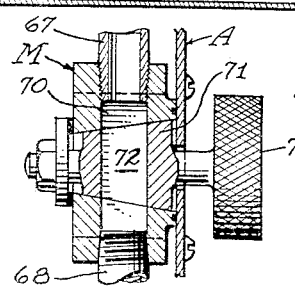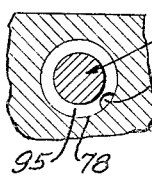

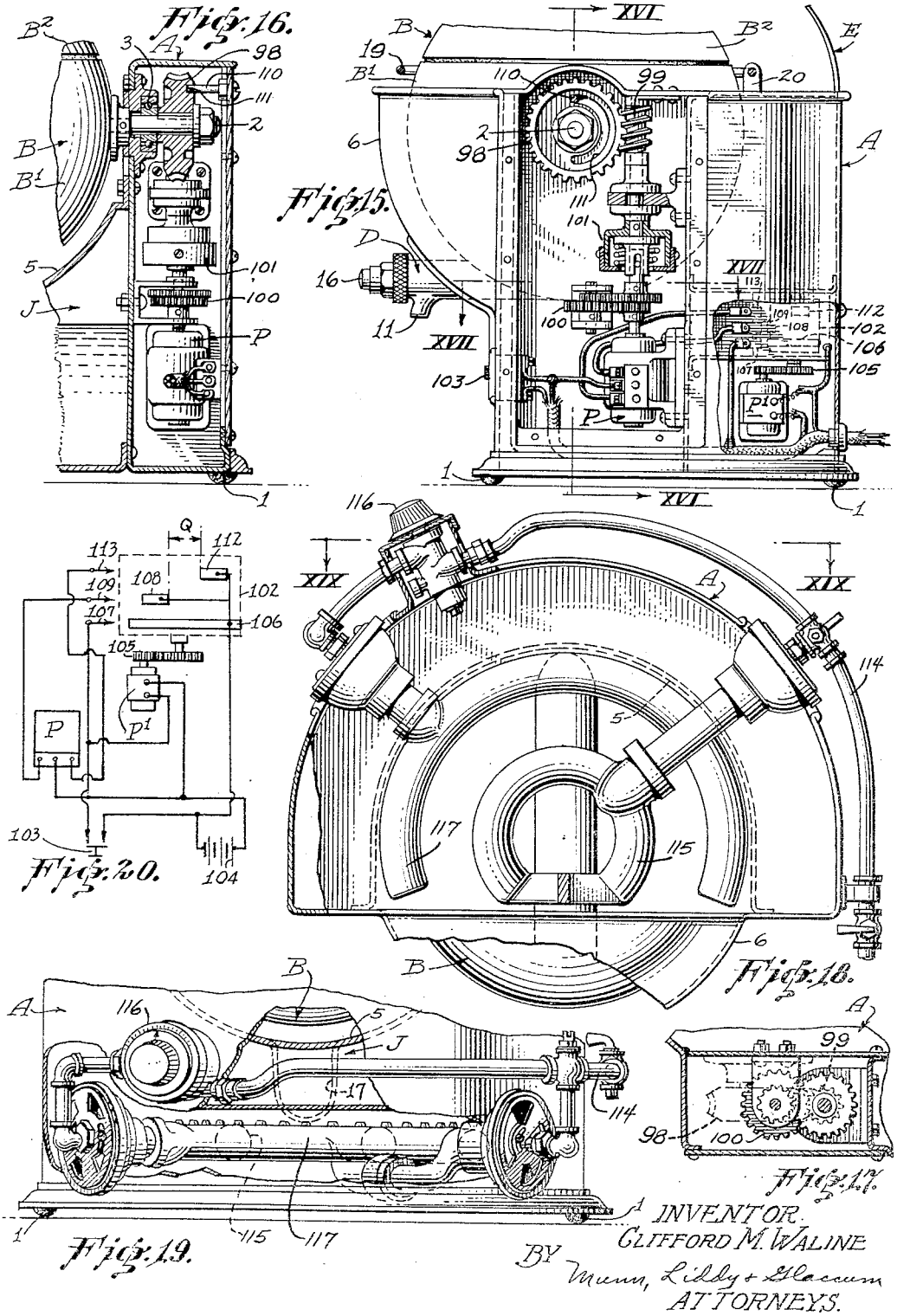

Patented Apr. 3, 1951

2,547,067

UNITED STATES PATENT OFFICE 2,547,067

AUTOMATIC COFFEE BREWER

Clifford M. Waline, Oakland, Calif.

Application April 16, 1946, Serial No. 662,533

3 Claims. (Cl. 99—283)

An object of my invention is to provide an automatic coffee brewer in which the actual contact time between the hot water and the coffee is controlled so that coffee of a desired strength and flavor will be made. The brewing time can be adjusted within predetermined limits.

A further object of my invention is to provide an automatic coffee brewer in which the quantity of coffee can be controlled so that a greater or less amount of coffee can be brewed at any given time.

Still a further object of my invention is to provide an automatic coffee brewer wherein hot water is caused to pass through the ground coffee beans, the coffee after being brewed being kept separated from the ground coffee. Novel means is used for maintaining the ground coffee in a thin layer and for preventing the ground coffee from gathering into one part of a coffee bag. The hot water is poured uniformly over the entire area covered by the ground coffee and therefore all of the coffee flavor is extracted from the ground coffee during the flow of water therethrough.

In a modified form of the invention, the operation of the automatic coffee brewer is controlled by an electro-mechanical means so that only a push button need be pressed for starting the cycle of operations which will result in the making of coffee.

In another modified form of the invention gas heat is used in lieu of electric heat.

Other objects and advantages will appear in the following specifications, and the novel features of the device will be particularly pointed out in the appended claims.

My invention is illustrated in the accompanying drawings forming a part of this application, in which:

Figure 3 is a side elevation when looking from the right hand side of Figure 1;

Figure 4 is a side elevation when looking at the left hand side of Figure 1;

Figure 5 is an enlarged view of the timing mechanism;

Figure 6 is a vertical section taken substantially along the line VI—VI of Figure 5;

Figure 7 is an enlarged transverse section of the coffee dispensing valve shown in Figure 4;

Figure 8 is an enlarged view of the water volume selector valve and associate mechanism, portions being shown in section;

Figure 9 is an enlarged horizontal section of the pressure piston taken along the line IX—IX of Figure 8;

Figure 10 is a vertical section taken along the line X—X of Figure 8 and shows a rear elevation of the water volume selector valve and also shows a float valve for controlling the cold water inlet;

Figure 11 is a vertical section through the water volume selector valve and taken substantially along the line XI—XI of Figure 10;

Figure 12 is a perspective view of the disc-shaped coffee bag shown operatively supported in the automatic coffee brewer;

Figure 13 is a perspective view of the grid support for the coffee bag;

Figure 14 is a perspective sectional view of a modified form of the ground coffee holder;

Figure 15 is a side elevation of a modified form of the invention with a side plate removed for showing the automatic coffee brewer controlled by an electro-mechanical means;

Figure 16 is a vertical section taken along the line XVI—XVI of Figure 15;

Figure 17 is a horizontal section taken along the line XVII—XVII of Figure 15;

Figure 18 is a bottom plan view of a modified form of the invention where gas is used in place of electricity for heating;

Figure 19 is a rear elevation of the automatic coffee brewer shown in Figure 18 when looking in the direction of the arrows XIX—XIX of that figure; and Figure 20 is a wiring diagram of the electrical control disclosed in Figures 15, 16 and 17.

While I have shown only the preferred forms of my invention, it should be understood that various changes or modifications may be made within the scope of the appended claims without departing from the spirit and scope of the invention.

Figure 2:
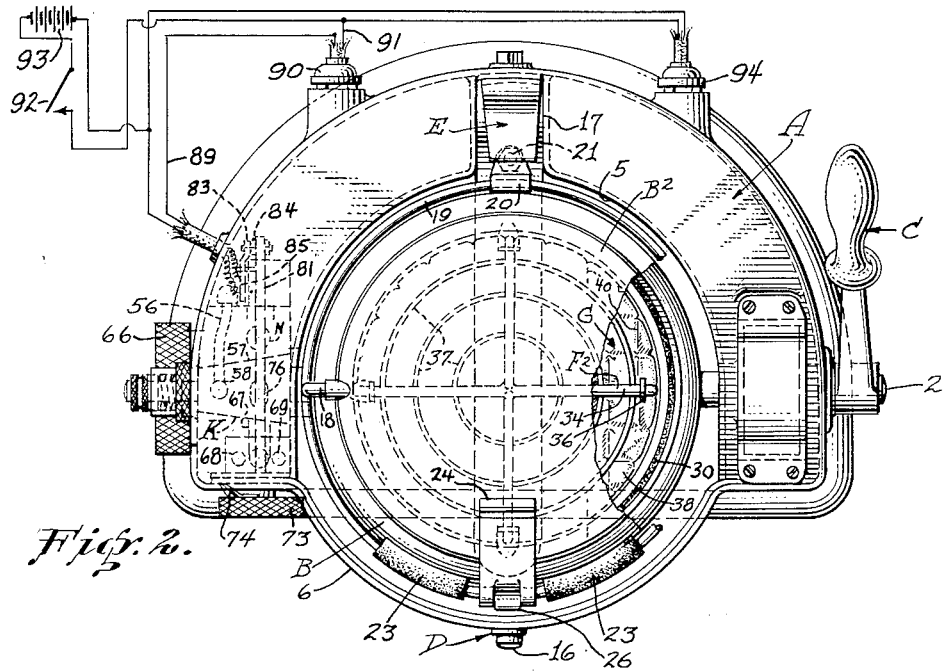
Figure 2 is a top plan view of Figure 1 and illustrates the wiring circuits.
Figure 1:
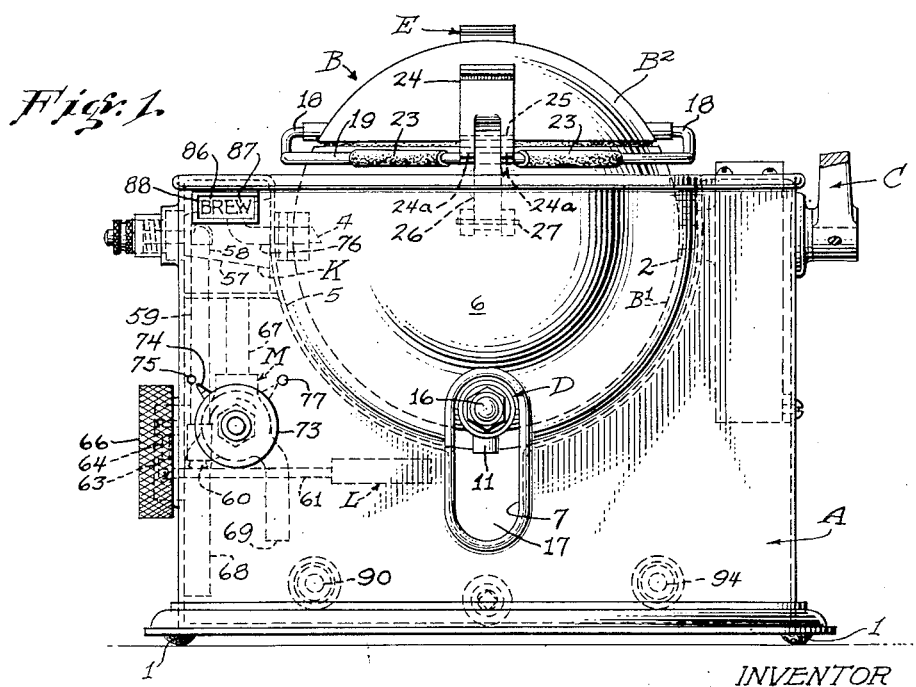
Figure 1 is a front elevation of the automatic coffee brewer.

In carrying out my invention, I provide a housing indicated generally at A in Figures 1 to 4, inclusive. The housing is supported by base pads 1 or any other suitable supporting means, and Figure 2 shows how the housing is U-shaped in top plan view. The housing rotatably carries a coffee brewing receptacle indicated generally at B, and this receptacle is preferably spherical in shape, although I do not wish to be confined to any particular shape. Figure 1 shows the receptacle as comprising a lower portion B1 and a cover B2. The lower portion B1 has a trunnion 2 that is supported in a bearing 3, see Figure 6, the bearing being carried by the housing A. A handle C is rigidly connected to the trunnion 2, see Figure 3, and the handle may be swung in a counter-clockwise manner as hereinafter described for rocking the trunnion in its bearing and for rotating the coffee brewing receptacle B into an inverted position.

The other side of the lower receptacle portion B1 is also rotatably supported in the housing A and Figure 10 indicates how it is rotatably mounted on a hollow trunnion 4, this trunnion being used for delivering hot water into the receptacle in a manner hereinafter described. Figure 10 further shows how the interior of the housing A is provided with a spherical recess 5 for receiving the receptacle B. The recess 5 is spaced a slight distance away from the receptacle B as shown in Figure 1 for permitting the receptacle to be rotated into an inverted position.

The housing A has an apron 6 that extends in front of the receptacle B as shown in Figure 3, the top of the apron lying in the same horizontal plane as the top of the housing A. The apron and adjacent front housing wall have a slot 7 in its lower portion for receiving a coffee dispensing spout D that is used for removing the brewed coffee from the receptacle. The spout D communicates with the bottom of the lower receptacle portion B1 and a valve casing 8 is mounted in the end of the outlet spout. Figure 7 illustrates how the valve casing 8 is received in the spout D and how it is held against rotation with respect to the spout by a key 9. The valve casing 8 has an opening 10, see Figures 3 and 7, that registers with the outlet end 11 of the spout. A valve rod 12 is slidably carried by the casing 8 and has a valve 13 that is designed to close a valve seat 14. A coil spring 15 presses against a push button 16 and keeps the valve 13 normally seated. A manual pressing of the push button 16 opens the valve 13 and permits the brewed coffee to flow from the receptacle and out through the outlet end 11.

A housing A is provided with an arcuate passageway 17 for the dispensing spout D to pass through when the receptacle B is rotated through an arc of approximately 180°. The passageway 17 extends up to the top of the housing A as shown in Figures 2 and 3 and a cam plate E projects beyond the passageway and is curved for depressing the push button 16 when the dispenser spout D reaches the dot-dash line position in Figure 3. This will open the valve 13 and permit the dispenser spout to act as an exhaust steam vent for the receptacle B while it remains inverted.

The receptacle cover B2 is pivotally supported by trunnions 18, these trunnions being carried by a wire ring 19, see Figures 2 and 4. The wire ring 19 has its rear portion pivotally mounted in a bracket 20 which in turn is secured to the lower receptacle portion B1 by a wing bolt 21, see Figure 3, and a lug 22 that is carried by the lower portion. The front of the ring 19 has two insulating hand-grip portions 23. Figure 3 shows a toggle member 24 having a grooved end 24a bearing against the ring 19. The member 24 is pivoted at 25 to a link 26 that is pivoted at 27 to the lower receptacle portion B1. The arrangement is such that when the toggle member 24 contacts with the ring 19 and cover B2, the cover is locked in the position shown. Figures 12 and 13 show how the cover B2 has a flange 28 received in an annular groove 29 provided in the top of the lower portion B1. A gasket 30 forms a liquid-tight seal between the cover and the lower portion when the cover is closed.

The lower receptacle portion B1 has a removable coffee bag supporting grid F1 and this grid has crossarms 31 removably received in spring clips 32, see Figure 13, the latter being carried by the lower portion B1. The arms 31 have flanges 33 that bear against the ends of the clips and hold the grid from transverse movement with respect to the receptacle. In like manner an upper grid F2 has cross arms 34 which are receivable in spring clips 35 carried by the cover B2. Flanges 36 prevent transverse movement of the upper grid F2 with respect to the cover.

Both grids F1 and F2 have concentric supporting rings 37 and between the two sets of rings I dispose a disc-shaped bag G for coffee. The bag comprises upper and lower layers of cloth 38 and ground coffee 39 is placed between two layers. In order to prevent the coffee from bunching in any portion of the disc bag, I provide rows of stitching 40 that crisscross each other to form square sections.

A modified form of ground coffee holder is illustrated at G1 where a perforated disc-like basket is shown. The basket comprises a lower section 41 and an upper section 42, the two being telescoped together and housing the ground coffee 39. The perforated basket can be received between the removable grids F1 and F2 if desired in lieu of the disc-shaped coffee bag G.

I will now describe the automatic timing mechanism whereby the receptacle B will be returned to its upright position after a predetermined time interval in which it is held in an inverted position, the swinging of the receptacle into the inverted position being accomplished by the handle C. In Figure 5, I show the trunnion 2 supporting a pulley 43 and this pulley has a coil spring 44 connected to its rim at 45. The other end of the spring is secured to a bracket 46 that in turn is connected to the housing A. The pulley 43 has a rack 47 formed in a portion of its grooved periphery and this rack meshes with a pinion 48 of a clock gear train indicated generally at H when the receptacle B is swung into an inverted position. An escapement arm 49 controls the rotation of the various pinions and gears in the gear train.

The pulley 43 has an arcuate groove 50 in one of its faces and a pin 51 carried by the housing A has its end received in the groove. When the handle C in Figure 3 is swung in a counter-clockwise direction, the pulley 43 will be rotated and the pin 51 will limit the swinging movement of the handle and the rotative movement of the receptacle B. The pin 51 will contact with the other end of the groove 50 when the receptacle B is inverted in its position. This movement is sufficient to place the spring 44 under a greater tension and to cause the rack 47 to mesh with and rotate the pinion 48 and its ratchet 52 into a position where the spring-pressed pawl 53, carried by a gear 54 of the train of gears H, will grip the ratchet in a new position.

The spring 44 will tend to return the receptacle B back to its starting or upright position and this movement is controlled by the clock mechanism H. It should be noted that the greater portion of the swing of the pulley 43 while the receptacle is swung from an upright into an inverted position will have no effect on the clock mechanism, because the rack 47 is comparatively short in length. The rack 47 meshes with the pinion 48 when the pulley 43 is near the end of its rotation. The spring 43 will instantly tend to rotate the pulley to return the receptacle to its upright position. The clock mechanism prevents this quick return and instead the pinion slowly permits the rack 47 to move. After a predetermined time period has elapsed, the clock mechanism will have caused the pinion 48 to traverse the entire length of the rack 47 whereupon the rack will be freed from the pinion and the spring 44 will quickly return the receptacle to its upright position. A control arm 55, shown in Figures 3 and 5, may be adjusted for regulating the time interval during which the receptacle will remain in the substantially inverted position, after which the spring 44 will return the pulley 43 to its starting position as shown in Figure 3.

It is best now to describe how water is admitted into the water compartment J of the housing A. The water compartment is shown in Figure 10 and the water inlet pipe 56, see Figure 4, leads into the housing A. In Figure 2 the water inlet pipe 56 is shown communicating with a conical valve, indicated generally at K, see also Figure 10. The valve casing receives the end of the pipe 56 and the conical valve body 57 has an elbow-shaped passageway 58 therein that communicates with the pipe 56 when the receptacle B is in its upright position. The other end of the passage 58 communicates with a discharge pipe 59 and a valve 60 is adapted to close the lower end of the pipe.

The valve 60 rests on an arm 61 of a float valve L. The arm 60 is pivoted at 62 to a U-shaped bracket 63, see Figure 8, the bracket in turn being yieldingly carried by spring-pressed bolts 64. The side wall of the housing A is provided with an inspection opening 65 adjacent to the float valve L and a cap 66 is threaded over the rim of the opening to normally cover the parts. Water will enter the water-heating compartment J through the pipe 59 until the water level reaches to a point where it will raise the float L and cause the valve body 60 to close the end of the pipe 59.

I will now describe the means for conveying the hot water from the water-heating compartment J into the receptacle B and then will set forth the electrical heating means for heating the water. Again referring to the conical valve K in Figure 10, it will be noted that a hot water inlet pipe 67 extends from the valve casing and is placed in communication with either one of two tubes 68 or 69 by a volume selector valve indicated generally at M and shown in Figures 8, 10 and 11. Figure 11 shows the pipe 67 communicating with a passage 70 in the valve body M. A conical valve plug 71 has a passage 72 therein for placing the pipe 67 in communication with the long tube 68 or the shorter tube 69.

The long tube 68 extends to a short distance above the bottom of the water compartment J and when the knurled knob 73 of the valve M is in the position shown in Figure 1, so that its pointer 74, registers with a mark 75 on the front of the housing A, the long tube 68 will be placed in communication with the water in the compartment J. Sufficient steam pressure is exerted in the water compartment J to force the hot water from the compartment into the tube 68 and the pipe 67. Referring to Figure 1, it will be noted that when the handle C is swung for inverting the receptacle B, the elbow passage 76 of the conical valve plug 57 will communicate with the pipe 67 and with the hollow trunnion 4. Hot water will therefore flow into the receptacle and since the receptacle is inverted, the dual grids F1 and F2 will support the coffee bag G below the trunnion 4. The hot water issuing from the trunnion will therefore flow over the entire bag and will pass through the ground coffee in much the same manner as in making coffee by the drip method. The water will continue to flow from the compartment J until the water level reaches the bottom of the tube 68. This quantity of water is pre-measured so that all of it will be retained in the lower portion B1 of the receptacle when the receptacle returns to its operated position. When the receptacle does return to its original position, the water will pass through the coffee disc-bag a second time.

If a less quantity of coffee is to be brewed, the volume selector valve knob 73 is rotated for placing the tube 69 in communication with the pipe 67. A less quantity of water will be delivered to the receptacle because the lower end of the pipe 69 is spaced at a greater distance from the bottom of the compartment than is the tube 68. The pointer 74 is swung by the knob 73 to the mark 77 when a lesser quantity of coffee is to be brewed.

Again referring to Figures 8 and 10, I show novel means for controlling the heating of the water. A pressure piston N is slidably mounted in a vertical cylinder 78 and an opening 79 places the bottom of the cylinder in communication with the interior of the water compartment, but at a point well above the water line. When the water is heated and steam is generated, the increased pressure caused by the steam will enter the cylinder 78 through the opening 79 and will raise the piston N. The piston when raised will uncover an exhaust steam passageway 80 that will permit the steam to escape to the atmosphere.

It will further be seen that the top of the piston acts on a lever 81 that is pivoted at 82. The left hand end of the lever actuates a switch arm 83 through the medium of a link 84. The switch 85 is opened when the piston N acts on the lever 81. Figures 1 and 8 show the right hand end of the lever 81 provided with a sign 86 carrying the word "Brew" thereon, as shown at 87. This sign is brought into registration with a window 88 when the lever 81 is raised and will indicate to the operator that the water is at a temperature sufficient to brew the coffee.

The switch 85 is also shown in Figure 2 and a wire 89 leads from the switch to a heating electrode 90. A second wire 91 leads from the same electrode back to an Off and On switch 92 that connects the coffee brewer with a source of current 93. When the switch 92 is closed, current will flow to a second heating electrode 94 and should the water be at a low temperature, the switch 85 will also connect the electrode 90 to the source of current. When the water temperature reaches a point where the sign "Brew" is brought into registration with the window 88, the switch 85 will be opened and this will cut out the heating electrode 90 and only the electrode 94 will remain connected to the current source. Electrode 90 will be automatically connected to the current source should the water temperature drop below a predetermined point.

When the water cools in the compartment J to a point where the pressure in the compartment is less than atmospheric pressure, the piston N will lower into a position where an annular groove 95 in the piston will register with the steam release passage 80. This passage communicates with the atmosphere and will permit the air flowing from the annular groove 95 to pass into a vertical groove 96, see Figure 9, that places the groove 95 in communication with the outlet opening 79 of the cylinder. A coil spring 97 is compressed when the piston is lowered and this spring will urge the piston upwardly and will aid the pressure in the compartment J in moving the piston so that the groove 95 will be out of registration with the passage communicating with the steam release pipe 80.

From the foregoing description of the various parts of the device, the operation thereof may be readily understood.

In operating the device for brewing coffee, the coffee bag G is placed between the grids and the water in the compartment J is heated in the manner already described. As soon as the water reaches a temperature where the signal "Brew" makes its appearance, the operator swings the handle C through substantially an arc of 180°. This will invert the receptacle and permit hot water to enter the receptacle through the hollow trunnion 4. The clock mechanism is wound up by the swinging of the handle and it will control the slow return movement of the receptacle until a predetermined time interval has elapsed. As soon as this occurs the rack 47 is freed and the spring 44 will swing the receptacle quickly back into its normal position. The water in the receptacle will pass through the coffee bag disc a second time and will extract all of the coffee flavor. The push button 16 may now be depressed for draining off any quantity of the coffee desired. The coffee can be kept hot by being in close proximity to the hot water compartment J.

In Figures 15, 16, 17 and 20, I show an electromechanical means for actuating the receptacle. In place of the handle C, the trunnion 2 has a worm gear 98 mounted thereon. This gear meshes with a worm 99 and the latter is connected to a reduction gearing 100 by a friction clutch 101. The gear reducing mechanism 100 is connected to a reversible motor P. Reference to Figure 15 shows a drum 102 rotated by means of a second motor P1.

When the push button 103 is temporarily closed, the battery 104 or other source of current will be connected to the motor P1 as shown in Figure 20. The motor through the reduction gearing 105 will rotate the conductor control drum 102. The rotation of the drum will bring conductor strip 106 into contact with brush 107, and this will lock the circuit between the source 104 and motor P1 and permit the push button 103 to be freed.

A continuing rotation of the drum 102 will bring a second conductor strip 108 into contact with a second brush 109 and connect the reversible motor P with the current source in such a way that the motor will be rotated in a direction to revolve the worm gear 98 and swing the receptacle B into an inverted position. The length of the strip 108 is such that the motor P will remain connected to the current source for a time period slightly longer than is necessary to rotate the worm gear 98 through 180 degrees.

A stop pin 110 rides in an arcuate groove 111 in the worm gear and stops rotation of the gear when the 180° cycle is completed. The clutch 101 permits the motor P to operate after the worm gear stops. As soon as the conductor 108 clears the brush 109, the motor P will stop and the self-locking worm 99 and worm gear 98 will hold the receptacle B in an inverted position until the third conductor strip 112 contacts the brush 113. The distance between the end of the strip 108 and the start of the strip 112 represents the coffee brewing period and is indicated by Q in Figure 20.

As soon as the brush 113 is contacted by the conductor strip 112, the motor P is connected with the current source 104 so that the motor will be reversed in its rotation. This will return the receptacle B to its normal upright position. Again the motor P will rotate for a period slightly beyond that necessary to swing the receptacle 180°. The clutch 101 will permit this prolonged rotation. The drum 102 will continue to rotate until the end of the conductor strip 106 clears the brush 107, whereupon the motor P1 will be disconnected from the current source and will stop. The automatic control is now ready for the next operation of the coffee brewer which is started by the temporary closing of the starting push button.

In Figures 18 and 19, I show gas heat being used for the automatic coffee brewer in place of electrical heat. A gas pipe 114 is connected to a central gas burner 115 that takes the place of the electric heating electrode 94 shown in Figure 2. An adjustable thermostat 116 controls the flow of gas to a second arcuate burner 117 that is concentric with the first. The second burner 117 flashes on only when the water temperature in the compartment J is below a predetermined point. In all other respects the form of automatic coffee brewer shown in Figures 18 and 19 operates the same as the form shown in Figures 1 to 4, inclusive. If desired, the automatic electromechanical control shown in Figures 15, 16, 17 and 20, may be used with the gas heat.

It should be noted that the quantity of hot water delivered to the receptacle when the latter is in an inverted position is greater than the capacity between the coffee bag and the cover and therefore the coffee will be steeped in the hot water until the receptacle is returned to its upright position. The steeping period is controlled by the clock mechanism or the Q shown in Figure 20. In brief then the hot water will be sprayed over the coffee bag and will drip therethrough while the receptacle is inverted. The quantity of water entering the receptacle will raise the water level to above the bag. The coffee is then steeped for a predetermined time period after which the receptacle will be righted and the water will again flow through the bag, completing the making of the coffee.

I claim:

1. An automatic coffee brewer comprising a housing; a receptacle; trunnions rotatably supporting the receptacle in the housing; said receptacle having a lower portion and a cover; a coffee bag supporting grill carried near the top of the lower portion; a second coffee bag supporting grill carried by the cover; a disc-shaped coffee holding bag; said grills clamping the coffee bag therebetween when the cover is in place on the receptacle; means for clamping the cover to the lower receptacle portion; one of said trunnions being hollow for directing hot water into the lower receptacle portion; said housing having a water heating compartment; connections between the hollow trunnion and the water heating compartment and including a valve for placing the water heating compartment in communication with the receptacle when the valve is actuated by the rotation of the receptacle into an inverted position, whereby the steam pressure in the compartment will force hot water through the connections, valve and hollow trunnion, into the receptacle; a handle connected to the other trunnion for swinging the receptacle into an inverted position; yielding means for rotating the receptacle from inverted position back into an upright position; timing means operatively connected to the receptacle and set into operation by the rotating of the receptacle; said timing means including means for holding the receptacle in an inverted position for a predetermined time interval for permitting the hot water to drip through the coffee bag; said timing means after a predetermined interval of time freeing the receptacle holding means and permitting the receptacle returning means to rotate the receptacle to an upright position where the liquid in the cover will again pass through the bag; and a dispensing faucet valve for the receptacle.

2. An automatic coffee brewer comprising a housing; a receptacle; trunnions rotatably supporting the receptacle in the housing; said receptacle having a lower portion and a cover; a coffee bag supporting grill carried near the top of the lower portion; a second coffee bag supporting grill carried by the cover; a disc-shaped coffee holding bag; said grills clamping the coffee bag therebetween when the cover is in place on the receptacle; means for clamping the cover to the lower receptacle portion; one of said trunnions being hollow for directing hot water into the lower receptacle portion; said housing having a water heating compartment; connections between the hollow trunnion and the water heating compartment and including a valve for placing the water heating compartment in communication with the receptacle when the valve is actuated by the rotation of the receptacle into an inverted position; whereby the steam pressure in the compartment will force hot water through the connections, valve and hollow trunnion, into the receptacle; a handle connected to the other trunnion for swinging the receptacle into an inverted position; yielding means for rotating the receptacle from inverted position back into an upright position; timing means operatively connected to the receptacle and set into operation by the rotating of the receptacle; said timing means including means for holding the receptacle in an inverted position for a predetermined time interval for permitting the hot water to drip through the coffee bag; said timing means after a predetermined interval of time freeing the receptacle holding means and permitting the receptacle returning means to rotate the receptacle to an upright position where the liquid in the cover will again pass through the bag; a dispensing faucet valve for the receptacle; and means for automatically opening the dispensing faucet valve as the receptacle is rotated into an inverted position and for holding the dispensing valve open as long as the receptacle remains inverted, whereby the receptacle will be vented to the atmosphere while in inverted position.

3. In an automatic coffee brewer; a housing having a closed water heating compartment; a coffee brewing receptacle having trunnions rotatably supporting it in the housing; one of the trunnions being hollow; a coffee holding bag disposed in the receptacle; a water inlet for the compartment; a float valve for maintaining the water level at a constant height in the compartment; means for heating the water; a valve for the hollow trunnion; a pipe leading from the compartment to the second valve; the second valve being actuated when the receptacle is inverted to place the pipe in communication with the hollow trunnion and closing the water inlet; a pair of branch pipes extending at different distances below the level of the water; a manually controlled valve for placing either branch pipe in communication with the pipe leading to the second valve; whereby when the receptacle is inverted, the steam pressure in the closed compartment will force heated water through the branch pipe in communication with the pipe that leads to the second valve so that a predetermined quantity of water will be delivered to the hollow trunnion and the receptacle.

CLIFFORD M. WALINE.

REFERENCES CITED

The following references are of record in the file of this patent:

UNITED STATES PATENTS

| Number | Name | Date |
| --- | --- | --- |
| 434,822 | Doty | Aug. 19, 1890 |
| 1,007,200 | Hessdorfer | Oct. 31, 1911 |
| 1,315,198 | Hendrix | Sept. 2, 1919 |
| 1,385,593 | Strohbach | July 26, 1921 |
| 1,580,501 | Lambert | Apr. 13, 1926 |
| 1,603,130 | McDuffie | Oct. 12, 1926 |
| 1,804,795 | Lee | May 12, 1931 |
| 1,952,915 | Evleth | Mar. 27, 1934 |
| 2,094,981 | Fromwiller | Oct. 5, 1937 |
| 2,194,807 | Oyen et al. | Mar. 26, 1940 |
| 2,266,090 | Smith | Dec. 16, 1941 |
| 2,268,633 | Aske | Jan. 6, 1942 |
| 2,325,684 | Kayden | Aug. 3, 1943 |
| 2,342,108 | Appleman | Feb. 22, 1944 |